(12) United States Patent
Galindo-Legaria et al.

(10) Patent No.: US 7,158,963 B2
(45) Date of Patent: Jan. 2, 2007

(54) VALIDATING MULTIPLE EXECUTION PLANS FOR DATABASE QUERIES

(75) Inventors: Cesar A. Galindo-Legaria, Redmond, WA (US); Florian Waas, Amsterdam (NL)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 11/089,235

(22) Filed: Mar. 24, 2005

(65) Prior Publication Data

US 2005/0267874 A1    Dec. 1, 2005

Related U.S. Application Data

(60) Continuation of application No. 10/785,328, filed on Feb. 24, 2004, now Pat. No. 7,010,524, which is a division of application No. 09/539,824, filed on Mar. 31, 2000, now Pat. No. 6,721,724.

(51) Int. Cl.
*G06F 17/30* (2006.01)
*G06F 7/00* (2006.01)

(52) U.S. Cl. .................................. 707/2; 707/100

(58) Field of Classification Search ........ 707/100–102, 707/200–201, 1–10, 104.1; 709/104, 219
See application file for complete search history.

(56) References Cited

U.S. PATENT DOCUMENTS

| 5,091,852 | A |   | 2/1992 | Tsuchida et al. ............ 395/600 |
| 5,548,758 | A | * | 8/1996 | Pirahesh et al. .................. 707/2 |
| 5,598,559 | A |   | 1/1997 | Chaudhuri .................... 395/602 |
| 5,608,904 | A |   | 3/1997 | Chaudhuri et al. .......... 395/602 |
| 5,659,725 | A |   | 8/1997 | Levy et al. .................. 395/600 |
| 5,717,911 | A |   | 2/1998 | Madrid et al. .............. 395/602 |
| 5,778,364 | A |   | 7/1998 | Nelson ........................... 707/6 |
| 5,822,747 | A | * | 10/1998 | Graefe et al. .................. 707/2 |
| 5,832,477 | A |   | 11/1998 | Bhargava et al. .............. 707/2 |
| 5,940,819 | A |   | 8/1999 | Beavin et al. ................. 707/2 |
| 5,956,706 | A | * | 9/1999 | Carey et al. ................... 707/2 |
| 6,339,770 | B1 | * | 1/2002 | Leung et al. .................. 707/2 |
| 6,341,281 | B1 |   | 1/2002 | MacNicol et al. ............. 707/3 |
| 6,353,818 | B1 | * | 3/2002 | Carino, Jr. ..................... 707/2 |
| 6,356,887 | B1 |   | 3/2002 | Berenson et al. .............. 707/2 |
| 6,374,263 | B1 | * | 4/2002 | Bunger et al. ............. 707/201 |
| 6,546,381 | B1 | * | 4/2003 | Subramanian et al. ......... 707/2 |
| 6,581,055 | B1 |   | 6/2003 | Ziauddin et al. ............... 707/4 |
| 6,598,004 | B1 |   | 7/2003 | Ishida et al. .................. 702/69 |

(Continued)

FOREIGN PATENT DOCUMENTS

JP    2001/045500    2/2001

(Continued)

OTHER PUBLICATIONS

Kabra, N., et al., "Efficient mid-query re-optimization of suboptimal query execution plans," *ACM Press*, 1998, 106-117.

(Continued)

*Primary Examiner*—Greta Robinson
*Assistant Examiner*—Jacques Veillard
(74) *Attorney, Agent, or Firm*—Woodcock Washburn LLP

(57) ABSTRACT

Validation of large numbers of alternative execution plans for a database query, either an exhaustive enumeration of the complete space of alternatives, or else an unbiased random sample, is performed by efficiently constructing execution trees from a data structure having groups alternative operators that are ranked in a directory. Each global rank of a plan identifies that plan uniquely among all the alternative plans. The operators are unranked from the directory according to a specification that characterizes the desired plans.

20 Claims, 6 Drawing Sheets

U.S. PATENT DOCUMENTS

| | | |
|---|---|---|
| 6,618,719 B1 | 9/2003 | Andrei .......................... 707/2 |
| 6,622,138 B1 * | 9/2003 | Bellamkonda et al. ......... 707/2 |
| 6,691,101 B1 * | 2/2004 | MacNicol et al. ............. 707/2 |
| 6,721,724 B1 * | 4/2004 | Galindo-Legaria et al. .... 707/2 |
| 6,807,546 B1 * | 10/2004 | Young-Lai .................. 707/102 |
| 6,934,699 B1 * | 8/2005 | Haas et al. .................... 707/2 |
| 7,010,524 B1 | 3/2006 | Galindo-Legaria et al. .... 707/3 |
| 2004/0030677 A1 | 2/2004 | Young-Lai ..................... 707/2 |

FOREIGN PATENT DOCUMENTS

| | | |
|---|---|---|
| JP | 2001/218077 | 8/2001 |
| JP | 2002/232766 | 8/2002 |

OTHER PUBLICATIONS

Waas, F., et al., "Counting, enumerating, and sampling of execution plans in a cost-based query optimizer," *AMC Press.*, 2000, 499-509.

\* cited by examiner

VALIDATING MULTIPLE EXECUTION PLANS FOR DATABASE QUERIES

RELATED APPLICATIONS

This application is a continuation of U.S. patent application Ser. No. 10/785,328, filed Feb. 24, 2004 now U.S. Pat. No. 7,010,524; which application is a divisional of U.S. patent application Ser. No. 09/539,824, filed Mar. 31, 2000 (now U.S. Pat. No. 6,721,724). The above applications are incorporated herein by reference.

TECHNICAL FIELD

The present invention relates to electronic data processing, and more particularly concerns testing the validity of execution plans produced by database search engines for retrieving data from databases in response to user queries.

BACKGROUND

Many database systems receive user queries written in a non-procedural language such as SQL (structured query language) or QBE (query by example). This class of language allows users to formulate queries against a database in terms characteristics of the desired data, rather than specifying the operations required to extract the desired data from the database. Such database systems contain a search engine that converts the non-procedural query into an execution plan or tree having a sequence of detailed operations that will obtain the requested data. Execution plans for a given query are seldom unique. That is, there is usually a number—frequently a very large number—of different execution plans, each having different operations and/or different orders of operations, that all generate the same set of result data. Not all plans, however, are equally desirable. Some have a lower—sometimes very much lower—execution cost than others. Cost is normally expressed in arbitrary units representing computer time and resources required to carry out all the operations of an execution plan. Search engines of this type almost always contain an optimizer that attempts to produce a plan having a low estimated cost for obtaining the data. Although search engines and optimizers involve a high degree of expertise to design, many of them are available from a number of different sources.

There are situations where it is desirable to obtain information about execution plans in addition to the one chosen by the optimizer for execution. In a product-development setting, for example, the ability to generate and test a large number of candidate plans for the same query is useful in designing, tuning, and checking the large number of components in a search engine, especially in its optimizer subsystem. Some of the purposes for testing multiple plans are:

Validating candidate plans. Do all candidates correctly compute the result of the query from which they were derived?

Stressing the execution engine. Is the engine actually capable of carrying out the plans considered by the optimizer, even those that are only seldom chosen as optimal?

Determining cost accuracy. Is the estimation of the costs of all plans accurate, compared to the actual costs of their execution?

Checking optimality of a selected plan. Is the plan that the optimizer actually selected in fact the one with the best execution values?

Finding cost distributions. What is the range of costs over many enumerated and uniformly sampled alternative plans for the same query? Such knowledge can be employed in the design of new optimization algorithms and techniques.

Validating, manipulating, and obtaining information concerning the performance of multiple execution plans for the same query can be valuable in other environments as well. In this context, the term "validation" is taken as a generic term to include other operations and manipulations involving multiple alternative plans for a database query, and also to include determinations of absolute or relative information concerning such plans.

Validating query plans is extremely valuable during development and testing of a query processor, and it useful even in a regular operating environment. However, the total number of possible alternative plans that can be developed to satisfy commonly encountered queries quickly becomes gigantic. Even the large, fast machines found in development laboratories cannot abide validating such huge numbers of alternative plans from a single query. For these reasons, checking alternative execution plans in database systems has been limited to selecting a relatively small number of plans more or less by hand, and running them through a validation process in the same manner that a single plan would be validated. Much more seriously, even the small number of tested plans in previous systems tend to be distributed in a non-random manner. That is, the plans selected for testing are clumped around certain strategies, and do not test a sample that is widely distributed among all the possible strategies and variations. The sample space is not uniform.

Even where a smaller number of possible alternative plans allows all of them to be validated, conventional methods provide no technique for listing these alternatives in any organized manner. If the alternatives cannot be organized in some way, a test program has no way to ensure that each of them is selected (and, selected only once) for testing, and thus no way to guarantee that the test is exhaustive.

Database-system technology thus requires a way to validate execution plans from a single query in a manner that can be sufficiently random or exhaustive.

SUMMARY OF THE INVENTION

The present invention permits the validation of large numbers of alternative execution plans for a database query with a process that organizes the components of such plans efficiently. The invention allows sampling a random subset of the alternative plans, rather than a subset confined to a relatively small part of the space of all possible plans. Where time is available for a test of every plan, the invention can provide an exhaustive list of all possible alternative plans for a given query.

The invention achieves these and other advantages by building groups of operators representing alternative plans for a query and that have unique identifiers or ranks. Execution trees for alternative plans can then be quickly assembled by unranking them to assemble different operators from the groups. The execution trees are then tested, analyzed, or otherwise manipulated. If desired, alternatives can be specified for producing only certain plans, for covering a particular range of plans, or for other purposes.

THE DRAWING

DETAILED DESCRIPTION

This description and the accompanying drawing illustrate specific examples of embodiments in which the present invention can be practiced, in sufficient detail to allow those skilled in the art to understand and practice the invention. Other embodiments, including logical, electrical, and mechanical variations, are within the skill of the art. Skilled artisans will also recognize features and advantages of the invention other than those explicitly set forth. The scope of the invention is to be defined only by the appended claims, and not by the specific embodiments described below.

Figure 1:
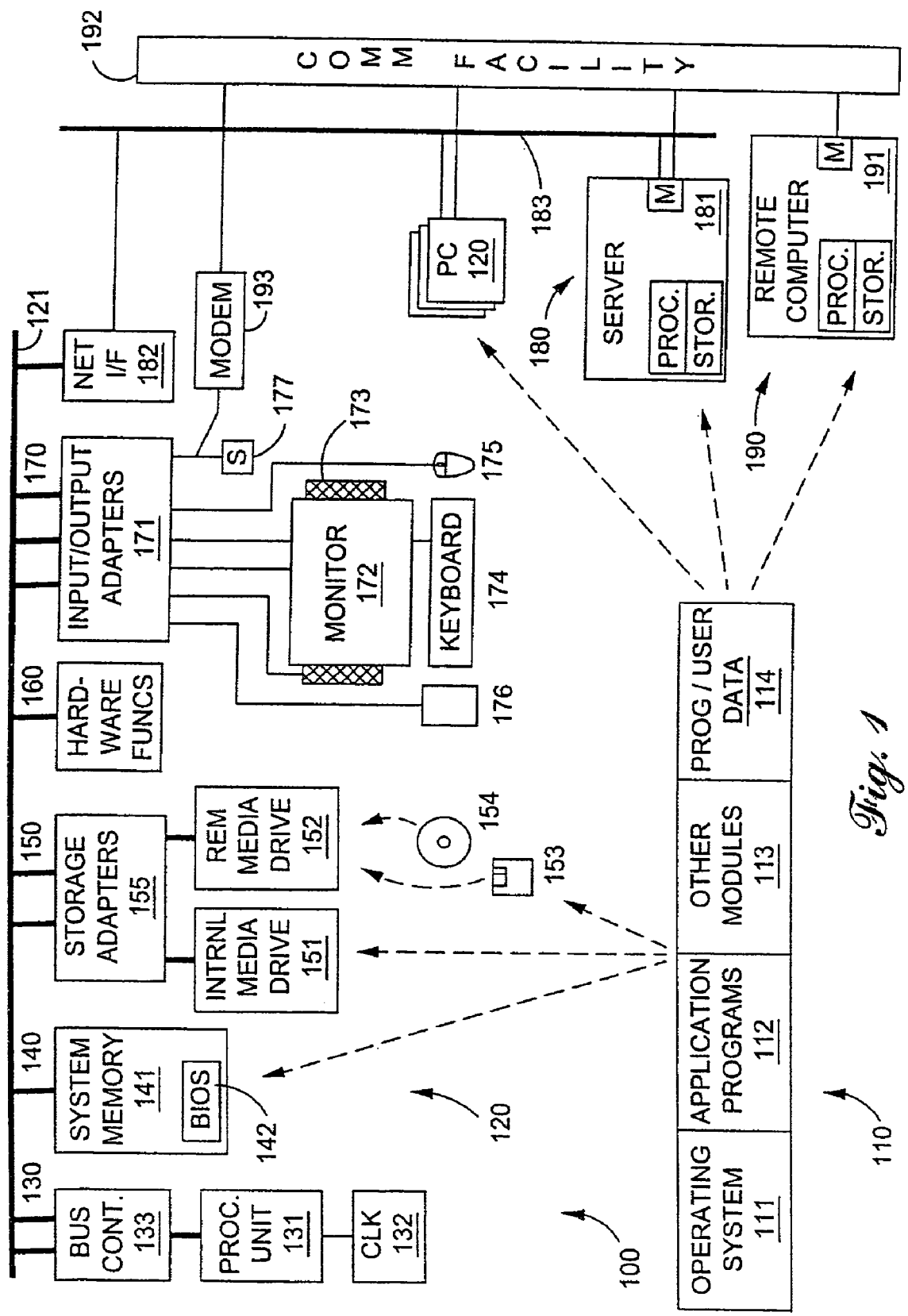
FIG. 1 is a high-level block diagram of an illustrative computer system serving as an environment for the invention.

FIG. 1 is a high-level diagram of an illustrative environment 100 having software 110 and hardware 120 for hosting the invention as executable instructions, data, and/or electronic and mechanical components. Other suitable environments, and variations of the described environment are also possible.

Hardware components 120 are shown as a conventional personal computer (PC) including a number of components coupled together by one or more system buses 121 for carrying instructions, data, and control signals. These buses may assume a number of forms, such as the conventional ISA, PCI, and AGP buses. Some or all of the units coupled to a bus can act as a bus master for initiating transfers to other units. Processing unit 130 may have one or more microprocessors 131 driven by system clock 132 and coupled to one or more buses 121 by controllers 133. Internal memory system 140 supplies instructions and data to processing unit 130. High-speed RAM 141 stores any or all of the elements of software 110. ROM 142 commonly stores basic input/output system (BIOS) software for starting PC 120 and for controlling low-level operations among its components. Bulk storage subsystem 150 stores one or more elements of software 110. Hard disk drive 151 stores software 110 in a nonvolatile form. Drives 152 read and write software on removable media such as magnetic diskette 153 and optical disc 154. Other technologies for bulk storage are also known in the art. Adapters 155 couple the storage devices to system buses 121, and sometimes to each other directly. Other hardware units and adapters, indicated generally at 160, may perform specialized functions such as data encryption, signal processing, and the like, under the control of the processor or another unit on the buses.

Input/output (I/O) subsystem 170 has a number of specialized adapters 171 for connecting PC 120 to external devices for interfacing with a user. A monitor 172 creates a visual display of graphic data in any of several known forms. Speakers 173 output digital audio data that may arrive at an adapter 171 as digital wave samples, musical-instrument digital interface (MIDI) streams, or other formats. Keyboard 174 accepts keystrokes from the user. A mouse or other pointing device 175 indicates where a user action is to occur. Block 176 represents other input and/or output devices, such as a small camera or microphone for converting video and audio input signals into digital data. Other input and output devices, such as printers and scanners commonly connect to standardized ports 177. These ports include parallel, serial, SCSI, USB, FireWire, and other conventional forms.

Personal computers frequently connect to other computers in networks. For example, local area network (LAN) 180 connect PC 120 to other PCs 120' and/or to remote servers 181 through a network adapter 182 in PC 120, using a standard protocol such as Ethernet or token-ring. Although FIG. 1 shows a physical cable 183 for interconnecting the LAN, wireless, optical, and other technologies are also available. Other networks, such as wide-area network (WAN) 190 can also interconnect PCs 120 and 120', and even servers 181, to remote computers 191. Computers 181 and 191 have processors, storage, and communications equipment similar to those of PC 120, although usually of higher capacity. FIG. 1 illustrates a communications facility 192 such as a public switched telephone network for a WAN 190 such as an intranet or the internet. PC 120 can employ an internal or external modem 193 coupled to serial port 177. Other technologies such as packet-switching ISDN, ATM, DSL, frame-relay are also available. In a networked or distributed-computing environment, some of the software 110 may be stored on the other peer PCs 120', or on computers 181 and 191, each of which has its own storage devices and media.

Software elements 110 may be divided into a number of types whose terminology overlaps to some degree. For example, the previously mentioned BIOS sometimes includes high-level routines or programs which might also be classified as part of an operating system (OS) in other settings. The major purpose of OS 111 is to provide a software environment for executing application programs 112 and for managing the resources of system 100. An OS such as Microsoft® Windows® or Windows NT® commonly implements high-level application-program interfaces (APIs), file systems, communications protocols, input/output data conversions, and other functions. Application programs 112 perform more direct functions for the user. A user normally calls them explicitly, although they can execute implicitly in connection with other applications or by association with particular data files or types. Modules 113 are packages of executable instructions and data which may perform functions for OSs 111 or for applications 112. Dynamic link libraries (.dll) and class definitions, for instance, supply functions to one or more programs. Data 114 includes user data of all types, data generated and/or stored by programs, and digital data that third parties make available on media or by download for use in computer 120. Software elements can be embodied as representations of program instructions and data in a number of physical media, such as memory 140, non-volatile storage 150, and signals on buses 183, 192, etc.

Figure 2:
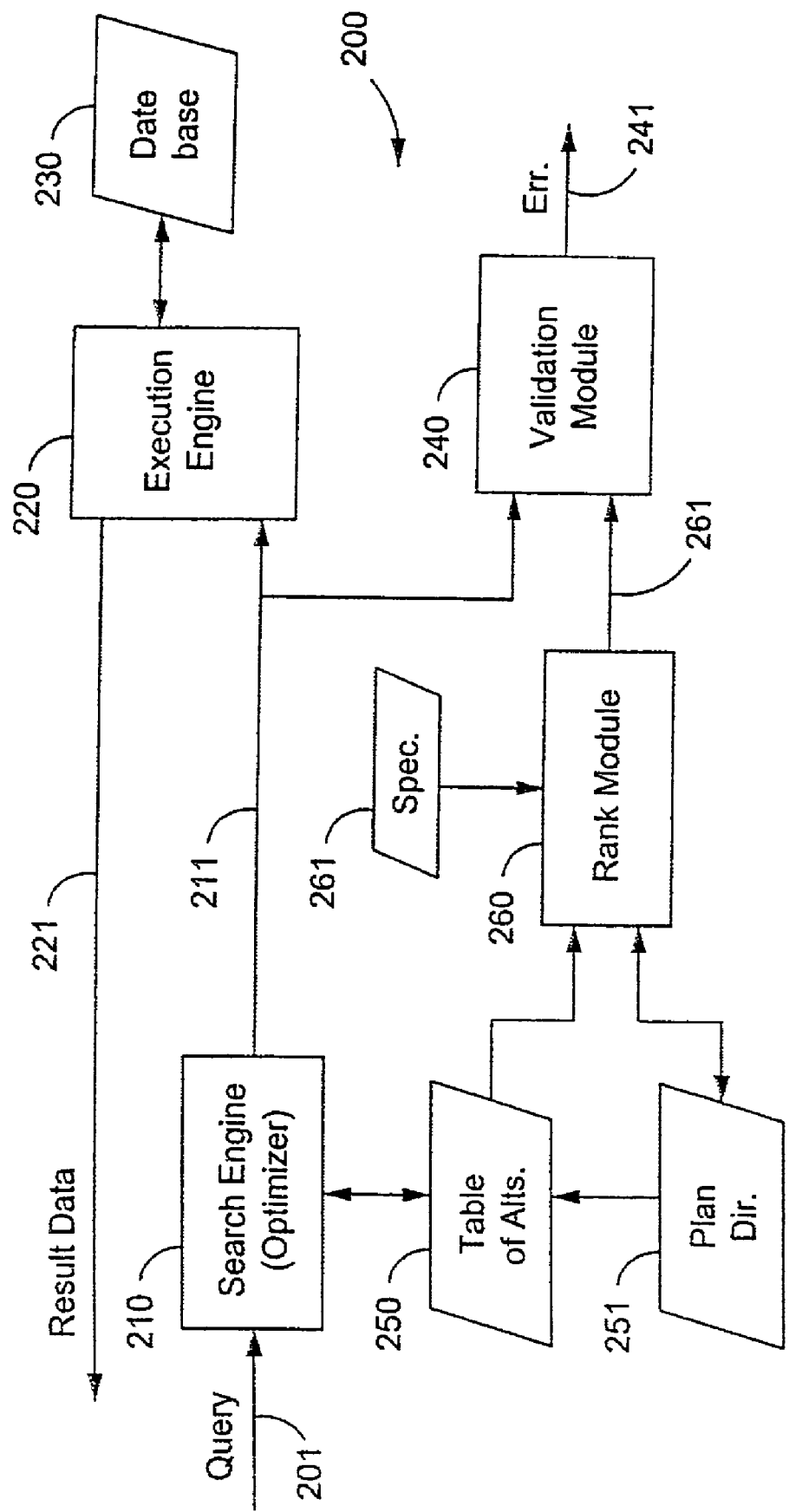
FIG. 2 is a block diagram of a portion of a database system relevant to the invention.

FIG. 2 is a block diagram of a portion of a database system 200 for carrying out the invention. The blocks can be implemented in hardware, software, or any combination thereof. Typically, system 200 resides in a large computer such as 181 or 191, although personal computers such as 120 are suitable as well.

Query optimizer 210 receives a query on line 201 from a client computer such as 120 or from some other source. The optimizer can be of the transformation-driven kind, as described in, e.g., W. J. McKenna, "Efficient Search in Extensible Database Query Optimization: The Volcano Optimizer Generator," PhD Thesis, University of Colorado, Boulder, 1993 and G. Graefe, et al:, "The Volcano Optimizer Generator: Extensibility and Efficient Search," *Int'l Conference on Data Engineering*, Vienna, Austria, 1993. It converts the query into a number of possible alternative plans in a conventional manner, determines the costs of these plans in terms of processing time and resources, and selects the best one for execution. (Although this unit could be aptly termed a "plan generator," this description follows industry custom in naming it according to one of the functions that it usually—but not necessarily—also performs, optimization of the generated plans.) The terms "plan" and "tree" are used interchangeably herein. Query execution plans are normally constructed as trees, although other structures are possible. Line 211 carries this execution plan or tree to an execution engine 220 such as the processors of computers 120, 181, or 191, or an interpreter for a set of operators specially designed for databases. Applying the plan to database 230 returns data on line 221 to satisfy the query, or to affect the database in some way. In normal operation, validation module 240 might (or might not) also receive the selected execution plan and perform some simple checks. Line 241 produces an error signal if the plan fails certain conventional tests. The optimizer stores the alternative plans in data structure 250. This data structure, a table in this embodiment, stores alternative operations and their interconnections at a number of different levels, as described hereinafter. This table is not destroyed in the process of determining an optimum plan, but is kept for later construction of alternative plans other than the single optimum plan. Ranking module 260 builds a directory 251 having pointers to the locations of various operators and groups within structure 250, and computes "rank data." Alternative plans for the query can be obtained by traversing the operators in different ways. Based on the computed rank data of operators, each complete plans is implicitly assigned a unique "rank," a numeric or other designation that uniquely identifies one particular alternative plan with respect to all the other possible alternative plans. How the "rank" of a plan is related to the "rank data" of its operators is described later.

Accordingly, the directory also keeps track of the number of plans that it is possible to generate. Module 260 also unranks the alternative plans for validation. That is, it builds execution trees for plans whose components are stored in table 250 by selecting particular alternative plans from the collection of possible plans. A specification 261 determines which plans are selected. Specification 261 characterizes the desired plans by named ranks, a set of randomly selected ranks, or other characteristics. The specification can be input from a test generator, directly from a developer, or from any other origin. Line 261 carries these execution plans to validation module 240, where they can be manipulated or analyzed in the same way as a plan emitted directly from optimizer 210.

Figure 3:
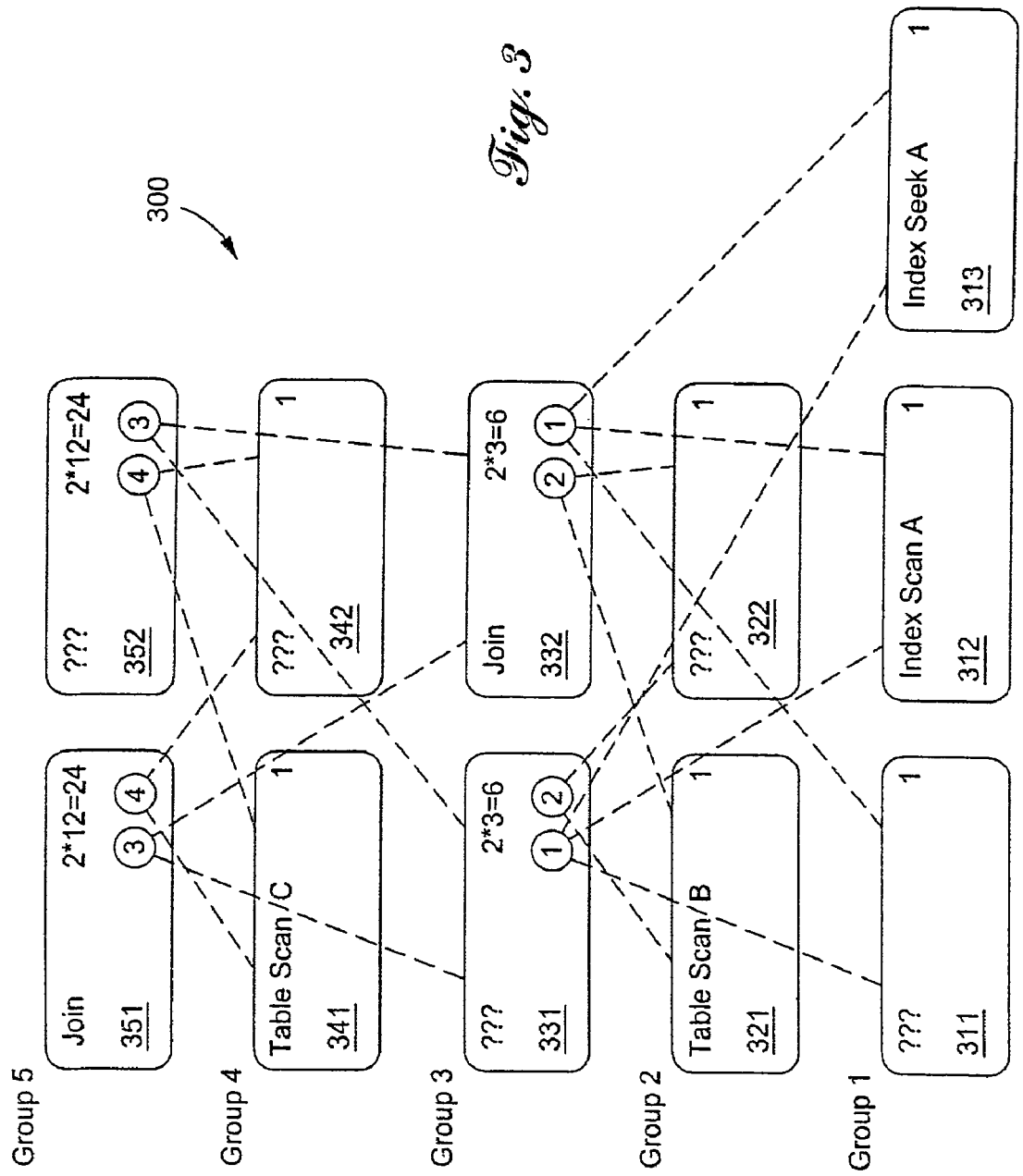
FIG. 3 is a symbolic representation of a data structure for holding multiple execution plans according to the invention.

FIG. 3 is a symbolic diagram 300 of a portion of an illustrative table 250 for compactly encoding information required to construct multiple execution plans so as to take advantage of the many common parts among different alternative plans. A number of groups, five in this example, each contain a collection of operators that point to other groups as children. Each candidate plan is a tree of these operators extracted from the groups.

A root group, 350, labeled Group 5, has two operators, a "Join" 351 and some other arbitrary operator 352, labeled "???" in FIG. 3. Optimizer 210 has determined that each of these is a possible initial operation in an execution tree for satisfying a particular query. If operator 351 is selected, its first operand is taken from Group 3, as shown in the left circle at the lower right corner of that operator. The two possible operators in Group 3 are some other unspecified operator 331 that the query optimizer generated when creating alternatives (labeled "???") and "Join" 332. The second operand of operator 351 is taken from Group 4, either "TableScan A" 341 or 342 (again, another generated operator labeled "???"). On the other hand, if operator 352 is selected from Group 5, then the first operand is selected from Group 4, and the second from Group 3.

Both of the operators in Group 4 happen to be terminals. That is, they do not have any further operators, and thus do not signal a selection from any other group in table 250.

Both of the operators in Group 3 do, however, require farther operations that must be selected from other groups. The dummy variable 331, labeled "???" first requires a selection among operations 311–313 from Group 1, followed by a selection between operations 321–322 from Group 2. "Join" operator 332 entails just the reverse, as indicated by the circles at its lower right corner and the lines proceeding therefrom.

In this abbreviated example, all of the operators in Groups 1 and 2 are terminals.

Diagram 300 contains 2×2×2×2×3=48 alternative plans. Selecting one possible alternative plan involves choosing one alternative from root Group 4, say operator 352. This allows 2×2×2×3=24 possible alternatives from the remaining groups. Both of the operators in Group 4 represent only a single alternative, while both operators in Group 3 represent 2×3=6 alternatives from the groups remaining after a choice made from group 3. All of the operators chosen in Groups 1 and 2 are terminals, each representing only a single alternative.

Figure 4:
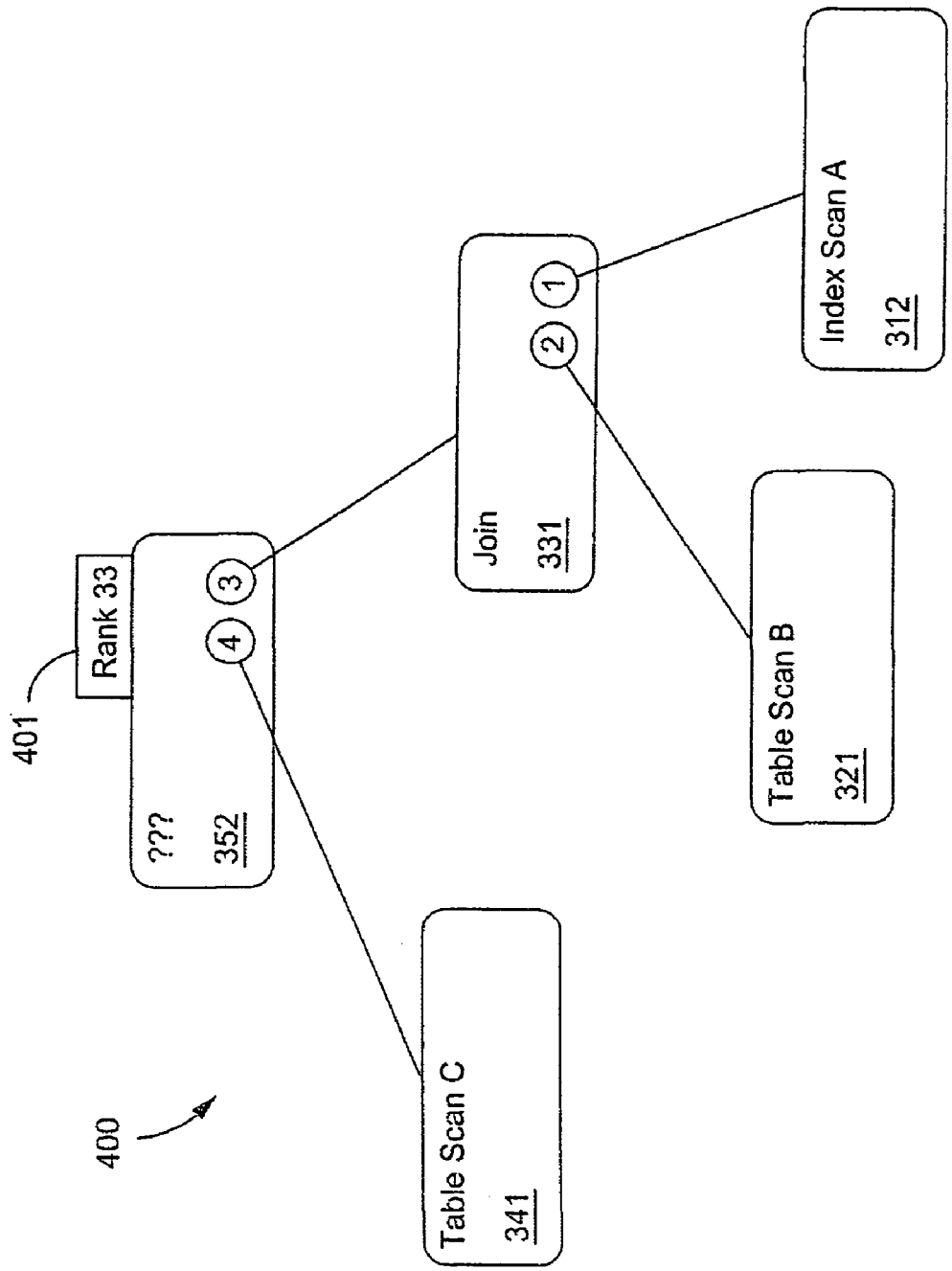
FIG. 4 shows a sample execution plan selected from the representation of FIG. 3.

FIG. 4 shows a sample execution plan 400 obtained by making a sequence of possible selections from diagram 300. This particular plan has a unique identifier or plan number 401. FIG. 3 has 24+24=48 possible plans, each of which represents a different combination of operator choices within the groups, and which can be given unique numbers '1'–'48'. At the root, Group-5 level, the plans starting with operator 351 can be assigned numbers '1'–'24'. Therefore, the choice in FIG. 4 of the other root operator 352 means that plan 400 has an identifier or rank 401 in the range '25'–'48'. Subsequent Group-4 operator 341 is a terminal, so it does not have any effect upon the rank of the final plan; there are no alternatives at this point in the plan tree. The selected Group-3 operator 331, however has six alternatives. These alternatives can be assigned local identifiers or ranks '1'–'6'. Combining these local ranks with the previously designated Group-5 numbers could lead to, say, assigning numbers '31'–'36' as the global identifiers or ranks of the alternatives resulting from selecting operator 332. At the Group-2 level, operator 321 is a terminal, and therefore carries only a single local rank number. Selecting it rather than alternative 322 further restricts the possible final rank numbers to three, say '31'–'33'. Finally, selecting operator 312 at the Group-1 level pinpoints the plan identifier to a single value, such as '33'. Therefore, plan 400 has been assigned a unique identifier, a rank '33', that fully determines the specific plan that was obtained by the series of choices at each group level. It is desirable, although not necessary, that rank designations be dense, such as consecutive numbers. This allows generating a valid plan for any number selected at random, and guarantees that different numbers will produce different plans.

This final identifier is the global rank of the particular alternative plan. It identifies the plan uniquely. Selecting for validation sample plans having random numbers in the range '0'–'47' leads to a wide variety of test cases, because the selections can be made entirely independently of the contents of the groups. There is no statistical clumping around any specific area of the collection of possible plans. If an exhaustive test is desired, sequentially selecting all possible numbers '0'–47' guarantees that every plan will be tested once and only once. The process of generating an operator tree given its unique "rank" is called "unranking." For example, unranking, plans '1', '18', and '43' means choosing the plans having those ranks from the pool of alternatives. Numeric ranks are convenient in several respects, but any other identifier, such as character designations, bit patterns, or memory addresses, can be employed instead, as long as they can be uniquely assigned to corresponding plan trees.

Some database-system optimizers use logical and physical operators. For example, a logical "join" can be carried out physically by a "hash join," a "merge join," and so forth. This embodiment screens out logical operators for counting and ranking. Execution plans only contain physical operators, although logical operators could be accommodated if desired. Some physical operators impose certain requirements upon their children. A merge join, for instance, requires that its input be in sorted order. A group could contain a "table scan" operator that does not deliver a sorted output, and also an "index scan" that does return the required sorted order. Accordingly, one operator can only be the child of another operator if the properties delivered by one are compatible with the properties required by the other. Conventional optimizers derive and check these properties as part of their normal function. Table 250 stores them, and they can be used to influence the ranking (counting) and unranking functions described below.

Figure 5:
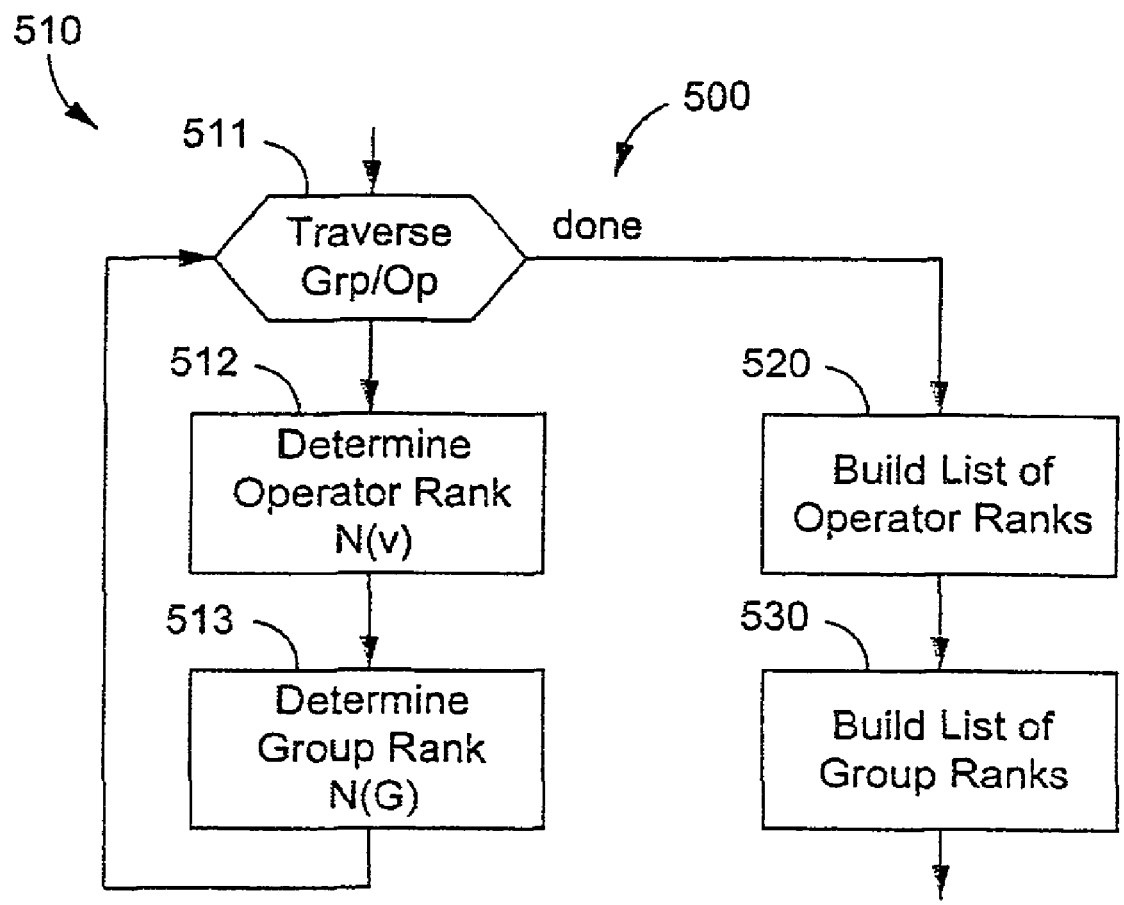
FIG. 5 is a flowchart of a ranking function according to the invention.

FIG. 5 shows a method 500 for setting up a directory 251 of alternative plans. If the alternatives were simply numbered separately as entire sequences of operations, the construction of a list of them would be trivial, but optimization would require an unreasonable amount of computer time and storage space. For this reason, common components or features of the plans are shared so as to reduce the overhead to a very great degree. This structure was introduced in the McKenna thesis cited hereinabove, where it is called the "MEMO structure." Using the example of FIG. 3, explicitly representing 48 plans each having 5 operators would require the storage of 240 operator representations. Sharing common parts enable representing the same set of 48 execution plans with only 11 operators.

The number of possible execution plans or trees rooted at some operator v is denoted $N(v)$. If the operator has no children groups (such as 341–342 in FIG. 3), then only one operator tree can be extracted from it. In the general case, there are two basic functions.

First, extracting a tree from a group involves selecting one of the operators of a group, then extracting a tree from that operator. A group G having operators $v_1, v_2, \ldots, v_n$, generates a number of trees equal to the sum of all the trees for each of the operators in that group: $N(G)=N(v_1)+N(v_2)+\ldots+N(v_n)$. In diagram 300, for example, N(Group 1)=3 and N(Group 2)=2.

Second, extracting a tree from an operator involves extracting trees from each of its child groups and integrating them with the operator as a root. An operator v with child groups $G_1, G_2, \ldots, G_n$ produces a different tree for every alternative in every group below it. Thus $N(v)=N(G_1)\times N(G_2)\times \ldots \times N(G_n)$. For example, N(Operator 331)=6.

To build a directory 251 of alternative plans, blocks 510 of FIG. 5 determine the rank data. Block 511 traverse the groups and the operators. Block 512 determines the rank data of the operators by calculating their N(v) values as defined above. Block 513 calculates the rank data N(G) for each group. Because the two rank-data definitions depend upon each other, the calculation starts from the leaf operators, which necessarily have N(v)=1, then proceeds in any desired tree-traversal algorithm. Block 520 builds a list of entries each having a pointer to an operator and the rank data of that operator. Block 530 builds a list of entries each having a pointer to one of the groups and the rank data of that group. These two lists form the directory 251 that permits building alternative plans quickly and easily.

Figure 6:
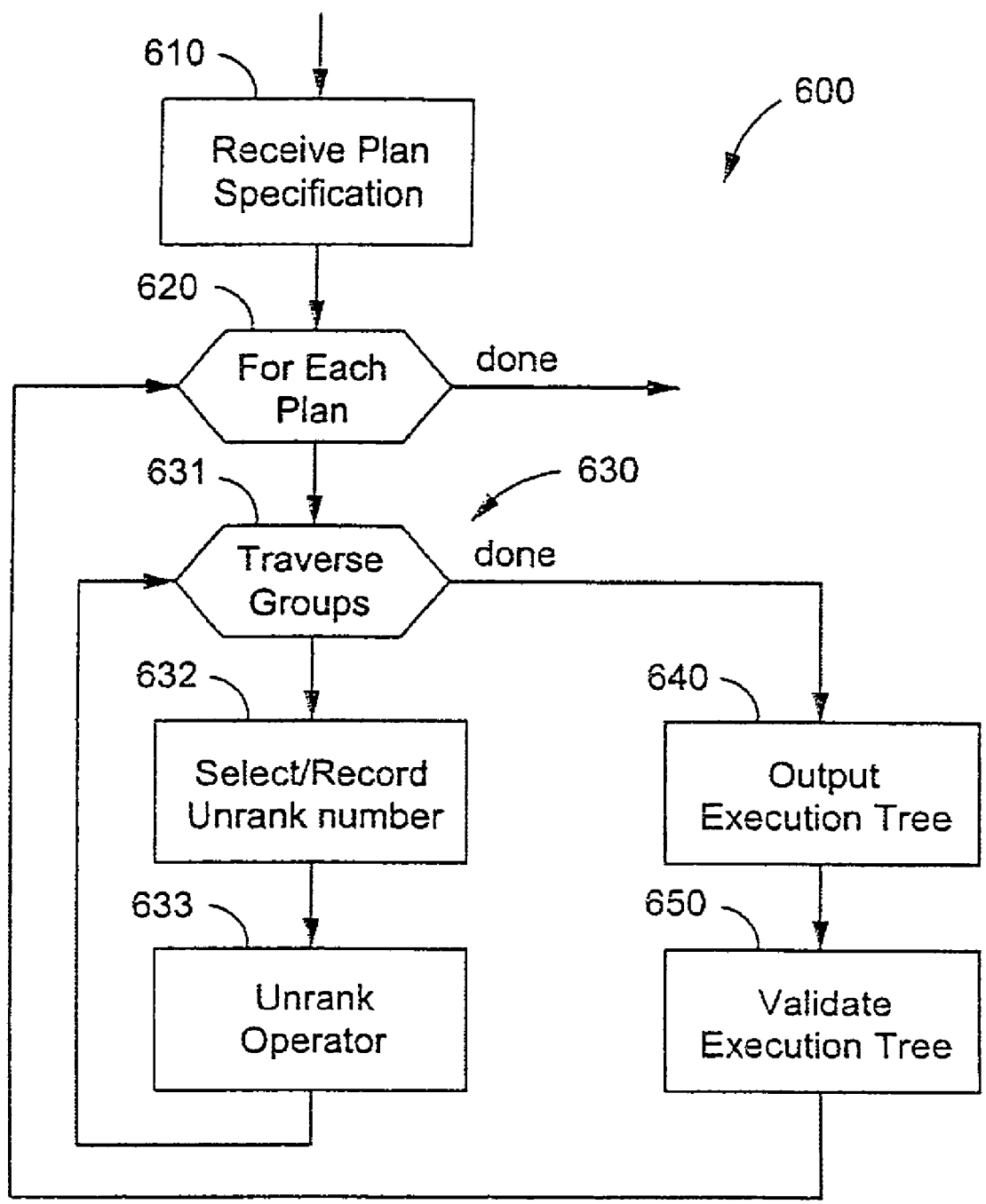
FIG. 6 is a flowchart of an unranking function according to the invention.

FIG. 6 is a flowchart 600 for constructing alternative execution plans in module 260, FIG. 2. Unranking is the process of selecting operators stored in table 350 and indexed by directory 251. It is substantially the reverse of ranking, or computing rank-data values of complete operator trees.

Unranking a group chooses one of the operators in the selected group, then unranks that operator with an adjusted rank number. As an example of unranking a group, the total number of possible trees that can be extracted from Group 3 in FIG. 3 is N(Operator 311)+N(operator 312)=12. Therefore, any number '1'–'12' can be unranked at this level. Unranking the numbers '1'–'12' yields:

UNRANK(Grp 3, 1)→UNRANK(Op 311, 1)
UNRANK(Grp 3, 2)→UNRANK(Op 311, 2)
. . .
UNRANK(Grp 3, 6)→UNRANK(Op 311, 6)
UNRANK(Grp 3, 7)→UNRANK(Op 312, 1)
UNRANK(Grp 3, 8)→UNRANK(Op 312, 2)
. . .
UNRANK(Grp 3, 12)→UNRANK(Op 312, 6).

The general procedure unranks a group G having operators $v_1, v_2, \ldots, v_n$. Denote the k-sum of this group by $N_k(G)=\Sigma_{i\leq k}N(v_i)$. Unranking a number r involves selecting an operator $v_k$ with k such that $N_{k-1}(G)<r\leq N_k(G)$. Operator $v_k$ is then unranked with an adjusted rank formed by decreasing its true rank by the quantity $N_{k-1}(G)$.

Unranking an operator calculates an adjusted rank number for each child group of the operator. The children groups are then unranked with their adjusted numbers. Finally, the operator is placed at the root of the result. Taking operator 331, FIG. 3, as an exemplar, any number from 1 through 6 can be unranked, viz:

UNRANK(Op 331, 1)→Op 331 OVER (UNRANK(Grp 2, 1), UNRANK(Grp 1, 1))
UNRANK(Op 331, 2)→Op 331 OVER (UNRANK(Grp 2, 2), UNRANK(Grp 1, 1))
UNRANK(Op 331, 3)→Op 331 OVER (UNRANK(Grp 2, 1), UNRANK(Grp 1, 2))
UNRANK(Op 331, 4)→Op 331 OVER (UNRANK(Grp 2, 2), UNRANK(Grp 1, 2))
UNRANK(OP 331, 5)→Op 331 OVER (UNRANK(Grp 2, 1), UNRANK(Grp 1, 3))
UNRANK(Op 331, 6)→Op 331 OVER (UNRANK(Grp 2, 2), UNRANK(Grp 1, 3))

The general procedure unranks an operator v having child groups $G_1, G_2, \ldots, G_n$. Let the k-product of this operator be $N_k(v)=\Pi_{i\leq k}N(G_i)$. Unrank number r for this operator determines the ranks $r_1, \ldots, r_n$ adjusted for the children groups, such that $1\leq r_i\leq N(G_i)$ for $i=1, \ldots, n$, and $r = 1 + \Sigma_{i=1,\ldots,n}((r_i - 1)N_{i-1}(v))$. The resulting operator tree is written as $v$ [UNRANK($G_1, r_1$), UNRANK($G_2, r_2$), ..., UNRANK($G_n, r_n$)].

Method 600 begins by receiving a specification of one or more rank designations in block 610. For the example discussed in connection with FIG. 4, the specification might select certain named plans '1', '18', and '43' for unranking. Block 620 iterates through the plans specified in block 610. Blocks 630 actually construct each plan by building a particular sequence of operators such as 400, FIG. 4, as a possible alternative for carrying out the query 201, FIG. 2. Block 631 traverses the groups of table 250, FIG. 2, beginning with the root group. Block 632 selects a number to unrank, according to the specification received at block 610, and records that number. The record of these number persists over a session of plans to control plan statistics. For example, an input specification frequently calls for random plans without duplicates. Therefore, this record can be used to prohibit the selection of a previously selected complete or partial sequence of operators. Block 633 unranks an operator from the current group as described above. Control then returns to block 631 to unrank an operator in the group or groups determined by the operator selected in the current level. When all necessary groups have been unranked, block 640 outputs a complete execution plan, comprising a tree of operators, to validation module 240, FIG. 2. Block 650 represents the action of module 250 in testing the completed tree, manipulating it, or obtaining information from it.

Method 600 ends when block 620 detects that all plans directed by the specification from block 610 have been processed.

As an example, consider unranking a Group-3 plan number, unranking each operator in that group. A person, or a script or random-number generator, can start with any number between '1' and '12'. If this entity initially chooses number '7', the top-most call is to UNRANK(Grp 3, 8), which translates to UNRANK(Op 312, 2). At this point a Group-3 operator choice is made by discarding operator 311. Operator 312 has a local rank of '2', which determines how to select its children. A driver program can generate every possible plan by calling UNRANK(Grp 3, 1), UNRANK (Grp 3, 2), etc., thereby obtaining a different operator tree for each call.

If the goal is to generate a random plan, a person or program can generate a random number to use at the root, then follow the deterministic procedure to make subsequent selections from the root to the leaves. Another alternative is to make random selections at each point. This alternative starts at the root group and chooses randomly one of the operators as the plan root. Then, on the selected operator, children are selected randomly, taking into account the annotations N(.) to obtain a uniform distribution. For instance, if a group contains operators Op1, Op2, and Op3, with N(Op1)=1, N(Op2)=20, and N(Op3)=30, selecting Op1 with probability ⅓ would produce plans rooted at OP1 ⅓ of the time, but would rarely generate plans rooted at Op3. That is, local random choices must be biased in order for the final generation of plans to be uniform. The above illustrative numbers would achieve uniform distribution by selecting operator Op1 with $1/51$ probability, Op2 with $20/51$ probability, and Op3 with $30/51$ probability, so each complete plan has the same probability of being obtained. Stated another way, the probability of selecting an operator from each group should be proportional to the number of possible subtrees of that operator in relation to the total number of subtrees of all operators in that group.

CONCLUSION

The present invention offers methods and apparatus for efficiently constructing large numbers of alternative execution plans for a single database query. This makes it feasible to validate many plans, by testing them, manipulating them, or obtaining information from them in a development or other environment. Logical and physical changes can be made to the illustrative apparatus shown, without departing from the spirit of the invention. The specific definitions and interconnections of the blocks can be varied. The steps of the illustrative methods can be varied; and, can be carried out in an order different from that shown, if desired.

We claim as our invention:

1. A method implemented at least in part by a computing device for constructing multiple alternative execution plans for a single database query, comprising:
    constructing one of the execution plans by
        selecting one of a plurality of operators from a root group of a data structure having a plurality of groups of alternative operators, certain of the operators having pointers to one or more different ones of the groups,
        selecting one of a plurality of the operators in at least one of the different groups,
        repeating the preceding act of selecting one of a plurality of the operators in at least one of the different groups until reaching an operator not having a pointer to another one of the groups,
    repeating the above acts, selecting at least one different operator for each of the constructed plans, where rank data is determined for each operator that distinguishes that operator from alternative operators in other groups, the rank data facilitating construction of the multiple alternative execution plans.

2. The method of claim 1, where the operators are selected by accessing a directory containing their locations in the data structure.

3. The method of claim 1, further comprising the act of adjusting the rank of one of the selected operators after it has been selected.

4. The method of claim 1, further comprising the act of receiving a specification containing at least one global rank designation, and where the selecting acts select their respective operators in response to the global rank designation.

5. The method of claim 4, where the respective operators are selected to result in the global rank designation uniquely identifying a single one of the alternative execution plans.

6. The method of claim 4, where the specification contains a plurality of global rank designations.

7. The method of claim 6, further comprising the act of deriving the plurality of global rank designations from the specification.

8. The method of claim 1, where the operators and pointers form a tree structure.

9. The method of claim 8, where each operator is selected in each repetition in a manner resulting in all of the possible alternative plans having approximately the same probability of being unranked.

10. The method of claim 8, where the probability of selecting an operator in each group is proportional to the number of possible subtrees of the respective operator in relation to the total number of subtrees of all operators in the respective group.

11. The method of claim 1, wherein determining rank data for each operator further includes assigning a local rank for each operator related to a number of alternative operators associated with that operator in other of the groups and wherein a unique global rank is produced for each of the alternative execution plans from the operator rank data.

12. The method of claim 1, where the rank data determined for each operator is based upon a number of alternative execution plans occurring through use of the respective operator.

13. The method of claim 12, where a global rank designation is determined for each alternative execution plan based upon respective ranks determined for each operator in the respective execution plan.

14. A computer-readable medium having a tangible component and having computer-executable instructions for performing a method for constructing multiple alternative execution plans for a single database query, the method comprising the acts of:
   constructing one of the execution plans by
      selecting one of a plurality of operators from a root group of a data structure having a plurality of groups of alternative operators, certain of the operators having pointers to one or more different ones of the groups,
      selecting one of a plurality of the operators in at least one of the different groups,
      repeating the preceding act of selecting one of a plurality of the operators in at least one of the different groups until reaching an operator not having a pointer to another one of the groups,
   repeating the above acts, selecting at least one different operator for each of the constructed plans; where rank data is determined for each operator related to a combination
   of operator choices in a plan tree occurring from the respective operator.

15. The method of claim 14, where the medium is a storage medium.

16. The method of claim 14, where the medium is a signal transmitted on a network of computers.

17. The method of claim 14, where a global rank is determined for at least one of the execution plans based on operator rank data of operators used in the respective plan.

18. The method of claim 17, where a global rank is determined for each execution plan based on operator rank data of operators used in each execution plan.

19. The method of claim 18, where a total number of global ranks determined is based on a total combination of operator choices occurring within the plurality of groups, and each global rank uniquely identifies a single one of the execution plans from all other execution plans.

20. A computer readable medium having at least one physical media and encoded with a computer program code for constructing multiple alternative execution plans for a single database query, the medium having stored thereon data structure having a plurality of groups of alternative operators for carrying out the database query, at least some of the operators having pointers to one or more different ones of the groups, the data structure including:
   a first data field including indicia representing locations of the operators within the data structure;
   a second data field including rank data for each operator related to alternative operators in other of the groups; and
   a third data field including a global rank based on the operator rank data for each query execution plan, the global rank uniquely identifying each execution plan relative to every other execution plan, the global rank data facilitating organization and validation of the multiple alternative execution plans.

* * * * *